(12) United States Patent
Maetani

(10) Patent No.: US 10,727,681 B2
(45) Date of Patent: Jul. 28, 2020

(54) CHARGE/DISCHARGE CONTROL CIRCUIT AND BATTERY DEVICE

(71) Applicant: ABLIC Inc., Chiba-shi, Chiba (JP)

(72) Inventor: Fumihiko Maetani, Chiba (JP)

(73) Assignee: ABLIC INC., Chiba (JP)

( * ) Notice: Subject to any disclaimer, the term of this patent is extended or adjusted under 35 U.S.C. 154(b) by 337 days.

(21) Appl. No.: 15/919,689

(22) Filed: Mar. 13, 2018

(65) Prior Publication Data

US 2018/0269704 A1    Sep. 20, 2018

(30) Foreign Application Priority Data

Mar. 16, 2017   (JP) ................ 2017-051676

(51) Int. Cl.
*H02J 7/00* (2006.01)

(52) U.S. Cl.
CPC ............ *H02J 7/0068* (2013.01); *H02J 7/008* (2013.01); *H02J 7/0029* (2013.01); *H02J 7/00302* (2020.01); *H02J 7/00306* (2020.01)

(58) Field of Classification Search
CPC ........ H02J 7/0068; H02J 7/0029; H02J 7/008; H02J 7/00302; H02J 7/00306
See application file for complete search history.

(56) References Cited

U.S. PATENT DOCUMENTS

2011/0205678 A1\* 8/2011 Baba .................... G06F 1/3212
361/86
2015/0331057 A1\* 11/2015 Imaizumi ............ G01R 31/388
324/427

FOREIGN PATENT DOCUMENTS

JP      2011-176940 A    9/2011
JP      2015-220856 A    12/2015

\* cited by examiner

*Primary Examiner* — David V Henze-Gongola
(74) *Attorney, Agent, or Firm* — Brinks Gilson & Lione

(57) ABSTRACT

A charge/discharge control circuit includes: a first power supply terminal connected to a first electrode of a secondary battery; a second power supply terminal connected to a second electrode of the secondary battery; a charge control terminal connected to a discharge control switch and a charge control switch; a detection terminal; a control circuit; and an output circuit configured to output a charge control signal from the charge control terminal, and configured to output a first voltage when a charger is connected and the control circuit permits charging, and to output a voltage of the detection terminal which differs from the first voltage when the charger is connected and the control circuit prohibits charging. The output circuit is capable of outputting a voltage of the second power supply terminal which differs from the first voltage when the charger is not connected.

6 Claims, 8 Drawing Sheets

CHARGE/DISCHARGE CONTROL CIRCUIT AND BATTERY DEVICE

RELATED APPLICATIONS

This application claims priority under 35 U.S.C. § 119 to Japanese Patent Application No. 2017-051676 filed on Mar. 16, 2017, the entire content of which is hereby incorporated by reference.

BACKGROUND OF THE INVENTION

1. Field of the Invention

The present invention relates to a charge/discharge control circuit and a battery device.

2. Description of the Related Art

There has been known a battery device including a charge/discharge control circuit, a secondary battery, a charge/discharge route connected to the secondary battery, a discharge control switch placed along the charge/discharge route, a charge control switch placed along the charge/discharge route, and a sense resistor placed along the charge/discharge route (see, for example, Japanese Patent Application Laid-open No. 2015-220856).

FIG. 6 is a diagram for illustrating an example of a battery device of the related art which is configured in the same way as the battery device described in Japanese Patent Application Laid-open No. 2015-220856.

In the example illustrated in FIG. 6, a battery device P10 includes a charge/discharge control circuit P1, a secondary battery P2, charge/discharge routes PRT0 and PRT3, a sense resistor P5, a discharge control switch P4, a charge control switch P7, and a resistor P3. A charge/discharge terminal PP− is provided on the charge/discharge route PRT0, and a charge/discharge terminal PP+ is provided on the charge/discharge route PRT3. The sense resistor P5, the discharge control switch P4, and the charge control switch P7 are placed along the charge/discharge route PRT0. The charge/discharge control circuit P1 includes a first power supply terminal PVDD, a second power supply terminal PVSS, a discharge control terminal PDO, a charge control terminal PCO, and detection terminals PVN and PVM.

The first power supply terminal PVDD is connected to a first electrode P2a of the secondary battery P2. The second power supply terminal PVSS is connected to a second electrode P2b of the secondary battery P2. The detection terminal PVN is connected to a point between the sense resistor P5 and the discharge control switch P4 along the charge/discharge route PRT0. The discharge control terminal PDO is connected to a gate terminal of the discharge control switch P4. The charge control terminal PCO is connected to a gate terminal of the charge control switch P7. The detection terminal PVM is connected via the resistor P3 to a point between the charge control switch P7 and the charge/discharge terminal PP− along the charge/discharge route PRT0.

In the example of FIG. 6, a charger is connected between the charge/discharge terminal PP+ and the charge/discharge terminal PP−, and a charge current flows in the sense resistor P5 when the secondary battery P2 is charged. Heat generation in the sense resistor P5 may accordingly occur when a large amount of current is used for the charging.

FIG. 7 is a diagram for illustrating another example of the battery device of the related art.

In the example illustrated in FIG. 7, the battery device P10 includes a discharge route PRT1 and a charge route PRT2 in place of the charge/discharge route PRT0 (see FIG. 6). A discharge terminal PDIS− is provided on the discharge route PRT1, and a charge terminal PCHA− is provided on the charge route PRT2. The sense resistor P5 and the discharge control switch P4 are placed along the discharge route PRT1. The charge control switch P7 is placed along the charge route PRT2. The detection terminal PVM is connected via the resistor P3 to a point between the charge control switch P7 and the charge terminal PCHA− along the charge route PRT2.

In the example of FIG. 7, no resistor is placed along the charge route PRT2 which makes the amount of heat generated during charging smaller than in the example of FIG. 6. However, with no discharge control switch placed along the charge route PRT2 in the example of FIG. 7, a short circuit between the charge terminal PCHA− and the charge/discharge terminal PP+ causes a discharge current from the secondary battery P2 to keep flowing along the charge route PRT2.

A battery device in which a diode for cutting off a discharge current is placed along a charge route has been known (see, for example, Japanese Patent Application Laid-open No. 2011-176940).

FIG. 8 is a diagram for illustrating an example of a battery device of the related art in which a diode for cutting off a discharge current is placed along a charge route as in the battery device described in Japanese Patent Application Laid-open No. 2011-176940.

In the example illustrated in FIG. 8, a diode P8 which cuts off a discharge current is placed along a charge route PRT2. The diode P8 can accordingly cut off a discharge current from a secondary battery P2 when a charge terminal PCHA− and a charge/discharge terminal PP+ are short-circuited.

However, the diode P8 in the example of FIG. 8 presents resistance to a charge current with which the secondary battery P2 is charged. Heat generation in the diode P8 may accordingly occur when a large amount of current is used for the charging.

As described above, when a discharge route and a charge route are connected to a secondary battery, the related art fails to provide proper discharge control and charge control on the charge route while reducing heat generation during charging.

SUMMARY OF THE INVENTION

It is therefore an object of the present invention to provide a charge/discharge control circuit and a battery device with which, when a discharge route and a charge route are connected to a secondary battery, discharge control and charge control can be performed properly on the charge route while heat generation during charging is reduced.

In one embodiment of the present invention there is provided a charge/discharge control circuit, having:

a first power supply terminal configured to connect to a first electrode of a secondary battery;

a second power supply terminal configured to connect to a second electrode of the secondary battery;

a charge control terminal configured to connect to a gate terminal of a discharge control switch and a gate terminal of a charge control switch;

a detection terminal;

a control circuit; and an output circuit configured to output a charge control signal from the charge control terminal, the discharge control switch and the charge control switch being placed along a charge route connected to the second electrode, the detection terminal being connected to a point along the charge route opposite from the second electrode with the discharge control switch and the charge control switch interposed therebetween, the output circuit being configured to output a first voltage, provided that a charger is connected between a charge terminal which is disposed on the charge route and a charge/discharge terminal which is disposed on a charge/discharge route connected to the first electrode, and that the control circuit permits charging, the output circuit being configured to output a voltage of the detection terminal which differs from the first voltage, provided that the charger is connected between the charge terminal and the charge/discharge terminal, and that the control circuit prohibits charging, and the output circuit being configured to be able to output a voltage of the second power supply terminal which differs from the first voltage, provided that the charger is not connected between the charge terminal and the charge/discharge terminal.

In another embodiment there is provided a battery device, having:

the charge/discharge control circuit describe above;
the secondary battery;
the charge/discharge route connected to the first electrode of the secondary battery;
the charge/discharge terminal provided on the charge/discharge route;
the charge route connected to the second electrode of the secondary battery;
the charge terminal provided on the charge route;
the discharge control switch placed along the charge route;
the charge control switch placed along the charge route;
a discharge route connected to the second electrode of the secondary battery;
a discharge terminal provided on the discharge route; and
another discharge control switch placed along the discharge route.

According to the present invention, it is possible to provide the charge/discharge control circuit and the battery device with which, when the discharge route and the charge route are connected to the secondary battery, discharge control and charge control can be performed properly on the charge route while heat generation during charging is reduced.

DETAILED DESCRIPTION OF THE EMBODIMENTS

First Embodiment

Now, a charge/discharge control circuit 1 according to a first embodiment of the present invention is described with reference to the drawings.

Figure 1:
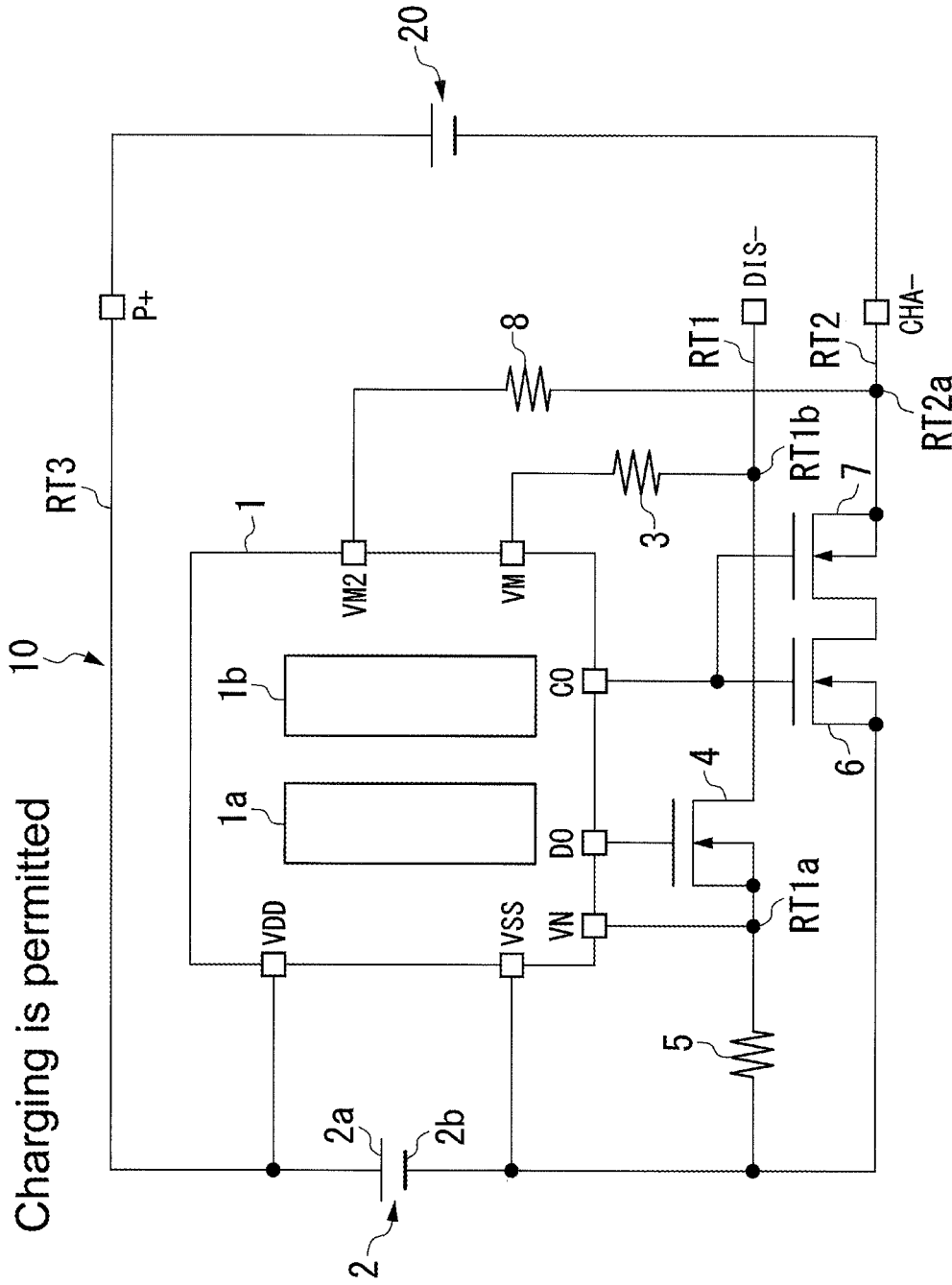
FIG. 1 is a diagram for illustrating an example of a battery device to which a charge/discharge control circuit according to a first embodiment of the present invention is applied.
Figure 2:
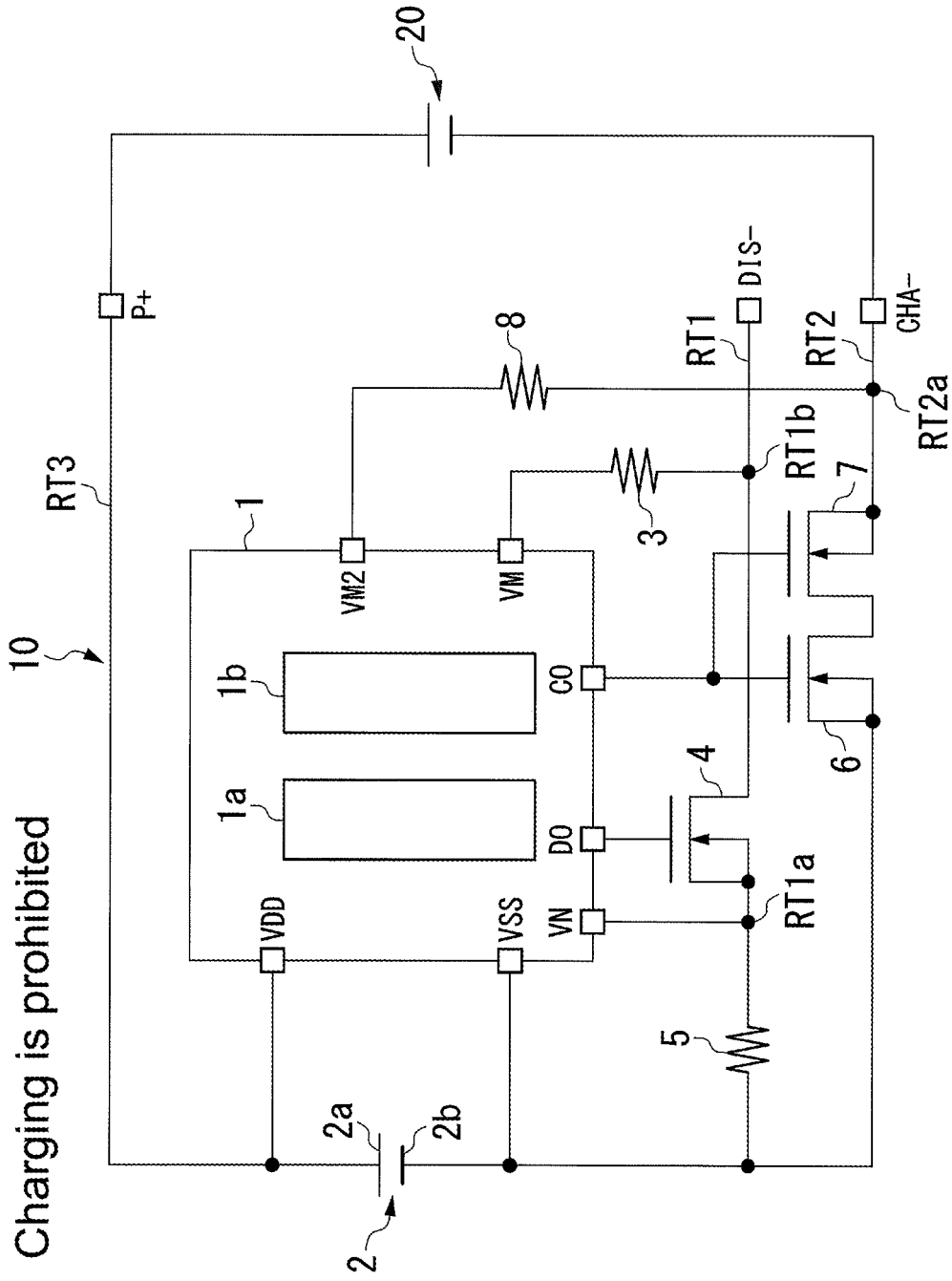
FIG. 2 is another diagram for illustrating an example of the battery device to which the charge/discharge control circuit according to the first embodiment is applied.
Figure 3:
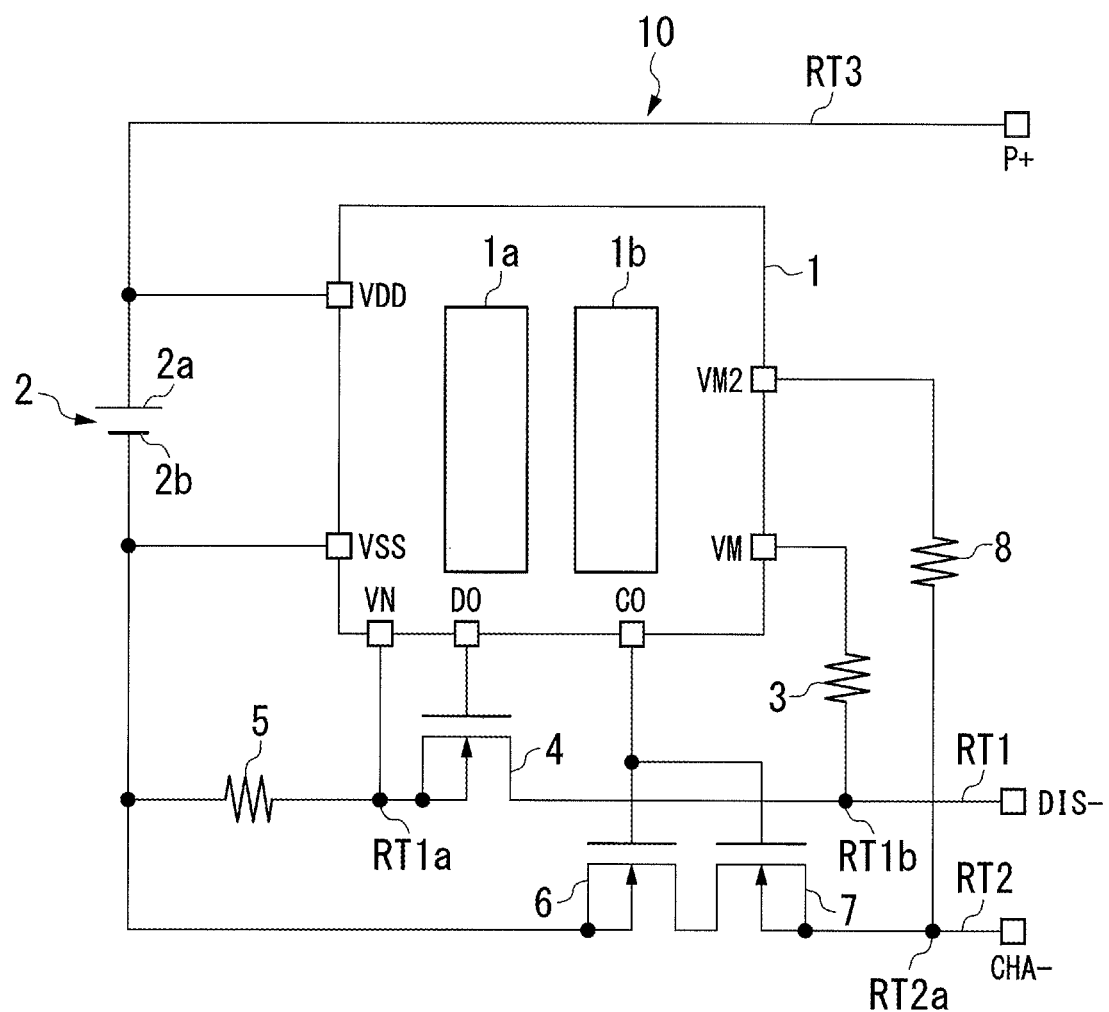
FIG. 3 is still another diagram for illustrating an example of the battery device to which the charge/discharge control circuit according to the first embodiment is applied.

FIGS. 1 to 3 are diagrams for illustrating an example of a battery device 10 to which the charge/discharge control circuit 1 according to the first embodiment is applied. To give a more detailed description, FIG. 1 is a diagram for illustrating an example of the battery device 10 to which the charge/discharge control circuit 1 according to the first embodiment is applied in a first case. FIG. 2 is a diagram for illustrating an example of the battery device 10 to which the charge/discharge control circuit 1 according to the first embodiment is applied in a second case. FIG. 3 is a diagram for illustrating an example of the battery device 10 to which the charge/discharge control circuit 1 according to the first embodiment is applied in a third case.

In the examples illustrated in FIG. 1 to FIG. 3, the battery device 10 includes the charge/discharge control circuit 1, a secondary battery 2, a charge/discharge route RT3, a charge/discharge terminal P+, a discharge route RT1, a discharge terminal DIS−, a resistor 5, a discharge control switch 4, a resistor 3, a charge route RT2, a charge terminal CHA−, a discharge control switch 6, a charge control switch 7, and a resistor 8.

The charge/discharge control circuit 1 includes a first power supply terminal VDD, a second power supply terminal VSS, a discharge control terminal DO, a charge control terminal CO, detection terminals VN, VM, and VM2, a control circuit 1a, and an output circuit 1b.

In the examples of FIG. 1 to FIG. 3, the charge/discharge route RT3 is connected to a first electrode 2a of the secondary battery 2. The charge/discharge terminal P+ is provided on the charge/discharge route RT3.

The discharge route RT1 is connected to a second electrode 2b of the secondary battery 2. The discharge terminal DIS− is provided on the discharge route RT1. The resistor 5 and the discharge control switch 4 are placed along the discharge route RT1. One of terminals of the resistor 5 is connected to the second electrode 2b of the secondary battery 2. The other terminal of the resistor 5 is connected to a source terminal of the discharge control switch 4. A drain terminal of the discharge control switch 4 is connected to the discharge terminal DIS−.

The charge route RT2 is connected to the second electrode 2b of the secondary battery 2. The charge terminal CHA− is provided on the charge route RT2. The discharge control switch 6 and the charge control switch 7 are placed along the charge route RT2. A source terminal of the discharge control switch 6 is connected to the second electrode 2b of the secondary battery 2. A drain terminal of the discharge control switch 6 is connected to a drain terminal of the charge control switch 7. A source terminal of the charge control switch 7 is connected to the charge terminal CHA−.

In the examples of FIG. 1 to FIG. 3, the first power supply terminal VDD of the charge/discharge control circuit 1 is connected to the first electrode 2a of the secondary battery 2. The second power supply terminal VSS is connected to the second electrode 2b of the secondary battery 2. The detection terminal VN is connected to a point RT1a between the resistor 5 and the discharge control switch 4 along the discharge route RT1. The discharge control terminal DO is connected to a gate terminal of the discharge control switch 4. The detection terminal VM is connected via the resistor 3 to a point RT1b between the discharge control switch 4 and the discharge terminal DIS− along the discharge route RT1.

The charge control terminal CO of the charge/discharge control circuit 1 is connected to a gate terminal of the discharge control switch 6 and a gate terminal of the charge control switch 7. The detection terminal VM2 is connected via the resistor 8 to a point RT2a along the charge route RT2 which is opposite from the second electrode 2b with the discharge control switch 6 and the charge control switch 7 interposed therebetween.

In the examples of FIG. 1 to FIG. 3, the output circuit 1b outputs from the charge control terminal CO a charge/discharge control signal which is used to control the charging/discharging of the charge terminal CHA−.

<First Case>

The first case is a case in which a charger 20 is connected between the charge terminal CHA− and the charge/discharge terminal P+ as illustrated in FIG. 1, and the control circuit 1a of the charge/discharge control circuit 1 permits charging.

In the example illustrated in FIG. 1, the output circuit 1b outputs the voltage of the first power supply terminal VDD which is equal to the voltage of the first electrode 2a of the secondary battery 2 in the first case. The gate voltage of the discharge control switch 6 and the gate voltage of the charge control switch 7 are accordingly equal to the voltage of the first power supply terminal VDD. The discharge control switch 6 and the charge control switch 7 are both switched on as a result. This supplies a charge current from the charger 20 to the secondary battery 2 via the charge route RT2 and the charge/discharge route RT3.

<Second Case>

The second case is a case in which the charger 20 is connected between the charge terminal CHA− and the charge/discharge terminal P+ as illustrated in FIG. 2, and the control circuit 1a of the charge/discharge control circuit 1 prohibits charging.

Specifically, the control circuit 1a prohibits charging when a charge current from the charger 20 to the secondary battery 2 is abnormal and the voltage of the detection terminal VM2 is below a charge overcurrent detection voltage set in the charge/discharge control circuit 1. The output circuit 1b outputs the voltage of the detection terminal VM2. The gate voltage of the discharge control switch 6 and the gate voltage of the charge control switch 7 are accordingly equal to the voltage of the detection terminal VM2. The source voltage of the charge control switch 7 is equal to the voltage of the detection terminal VM2 as well. The charge control switch 7 is therefore switched off. The supply of a charge current from the charger 20 to the secondary battery 2 is inhibited as a result.

The control circuit 1a prohibits charging also when the voltage of the secondary battery 2 is above an overcharge detection voltage set in the charge/discharge control circuit 1. The output circuit 1b outputs the voltage of the detection terminal VM2. The supply of a charge current from the charger 20 to the secondary battery 2 is inhibited as a result.

The voltage of the charger 20 is higher than the voltage of the secondary battery 2. The voltage of the second power supply terminal VSS is therefore higher than the voltage of the detection terminal VM2 in the second case in which the charger 20 is connected between the charge terminal CHA− and the charge/discharge terminal P+. This makes the gate voltage of the charge control switch 7 (the voltage of the second power supply terminal VSS) higher than the source voltage of the charge control switch 7 (the voltage of the detection terminal VM2) even if the output circuit 1b outputs the voltage of the second power supply terminal VSS. Hence the charge control switch 7 is not switched off. A charge current flows from the charger 20 to the secondary battery 2 as a result.

<Third Case>

The third case is a case in which the charger 20 is not connected between the charge terminal CHA− and the charge/discharge terminal P+ as illustrated in FIG. 3.

In the example of FIG. 3, which is an example of the battery device 10 to which the charge/discharge control circuit 1 according to the first embodiment is applied, the output circuit 1b outputs the voltage of the second power supply terminal VSS which is equal to the voltage of the second electrode 2b of the secondary battery 2 in the third case. The gate voltage of the discharge control switch 6 and the gate voltage of the charge control switch 7 are accordingly equal to the voltage of the second power supply terminal VSS. The source voltage of the discharge control switch 6 is equal to the voltage of the second electrode 2b of the secondary battery 2 (the voltage of the second power supply terminal VSS) as well. The discharge control switch 6 is therefore switched off. A discharge current cannot flow from the secondary battery 2 through the charge route RT2 as a result.

In the third case in which the charger 20 is not connected between the charge terminal CHA− and the charge/discharge terminal P+, the voltage of the detection terminal VM2 is equal to the voltage of the first electrode 2a of the secondary battery 2 (the voltage of the first power supply terminal VDD) when a discharge current from the secondary battery 2 flows in the charge route RT2 (to give a detailed example, when a load or the like is connected between the charge terminal CHA− and the charge/discharge terminal P+ by mistake, or when the charge terminal CHA− and the charge/discharge terminal P+ are short-circuited). This makes the gate voltage of the discharge control switch 6 (the voltage of the detection terminal VM2) higher than the source voltage of the discharge control switch 6 (the voltage of the second power supply terminal VSS) if the output circuit 1b outputs the voltage of the detection terminal VM2. Hence the discharge control switch 6 is not switched off. A discharge current keeps flowing from the secondary battery 2 through the discharge route RT1 and the charge/discharge route RT3 as a result.

As a solution, the output circuit 1b in the example of FIG. 3, which is an example of the battery device 10 to which the charge/discharge control circuit 1 according to the first embodiment is applied, outputs the voltage of the second power supply terminal VSS which is equal to the voltage of the second electrode 2b of the secondary battery 2 in the third case (the third case includes a case in which a discharge current from the secondary battery 2 flows in the charge route RT2 and a case in which a discharge current from the secondary battery 2 does not flow in the charge route RT2 (in other words, a case in which the charge terminal CHA− is open)) as described above. The discharge control switch 6 is switched off as a result.

To give a more detailed description, the output circuit 1b in the battery device 10 to which the charge/discharge control circuit 1 according to the first embodiment is applied is configured so as to be capable of outputting the voltage of the second power supply terminal VSS in the third case.

The output circuit 1b in the battery device 10 to which the charge/discharge control circuit 1 according to the first embodiment is applied outputs the voltage of the second power supply terminal VSS in the third case when a discharge current from the secondary battery 2 flows in the charge route RT2.

The output circuit 1b in the battery device 10 to which the charge/discharge control circuit 1 according to the first embodiment is applied outputs the voltage of the second power supply terminal VSS in the third case also when the charge terminal CHA− is open.

Although a detailed description is omitted, a discharge current is supplied from the secondary battery 2 through the discharge route RT1 and the charge/discharge route RT3 to a load (not shown) connected between the charge/discharge terminal P+ and the discharge terminal DIS− as in, for example, the battery device described in Japanese Patent Application Laid-open No. 2015-220856, when a condition for switching on the discharge control switch 4 is satisfied.

Figure 4:
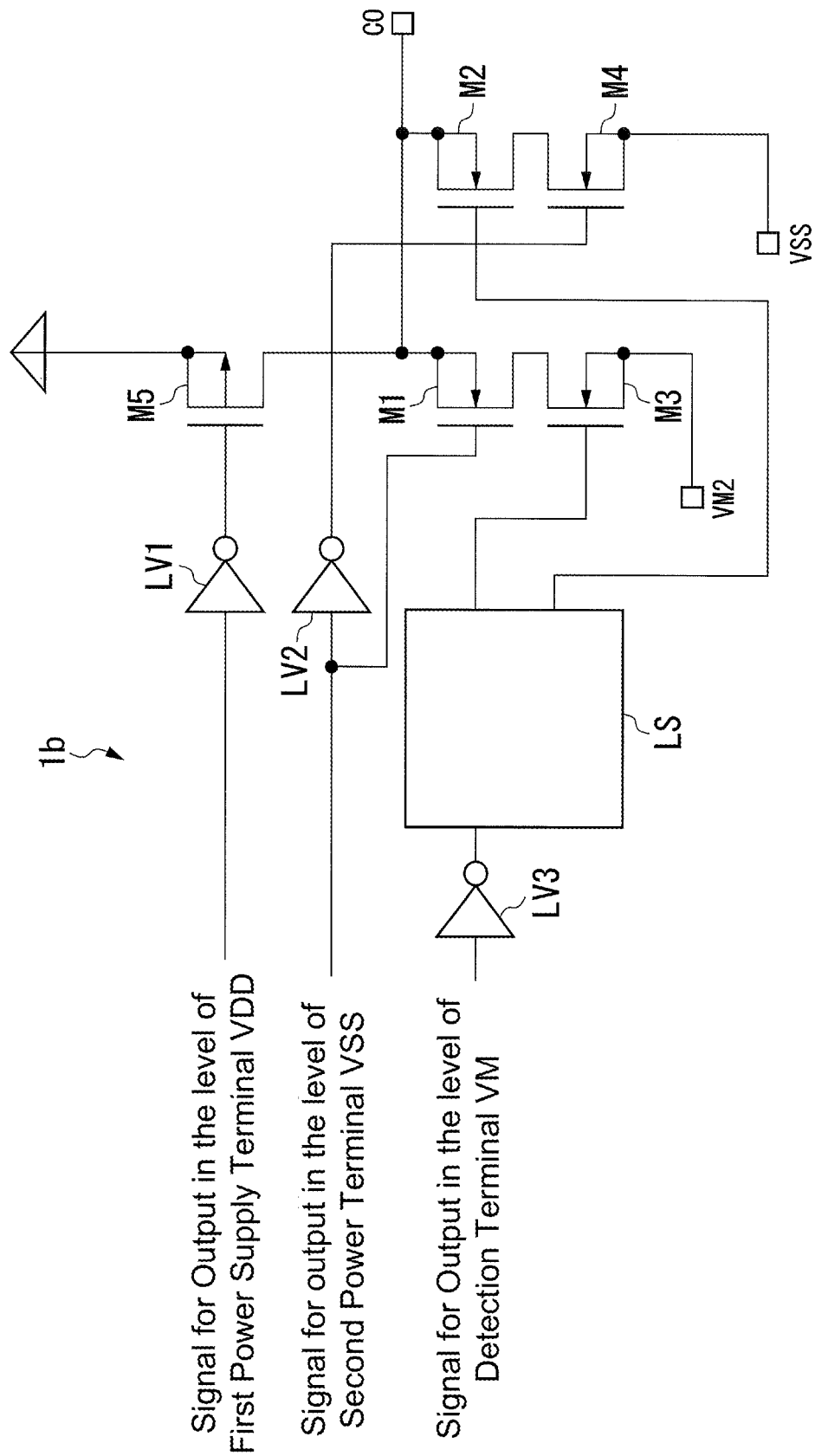
FIG. 4 is a diagram for illustrating an example of an output circuit of the charge/discharge control circuit according to the first embodiment.

FIG. 4 is a diagram for illustrating an example of the output circuit 1b of the charge/discharge control circuit 1 according to the first embodiment.

The output circuit 1b in the example illustrated in FIG. 4 includes switches M1, M2, M3, M4, and M5, inverters LV1, LV2, and LV3, and a level shifter LS.

The control circuit 1a (see FIG. 1) is connected to an input terminal of the inverter LV1, an input terminal of the inverter LV2, a gate terminal of the switch M1, and an input terminal of the inverter LV3.

An output terminal of the inverter LV1 is connected to a gate terminal of the switch M5.

A source terminal of the switch M5 is connected to the first power supply terminal VDD (see FIG. 1). A drain terminal of the switch M5 is connected to the charge control terminal CO.

An output terminal of the inverter LV2 is connected to a gate terminal of the switch M4. A source terminal of the switch M4 is connected to the second power supply terminal VSS. A drain terminal of the switch M4 is connected to a drain terminal of the switch M2.

A source terminal of the switch M1 is connected to the charge control terminal CO. A drain terminal of the switch M1 is connected to a drain terminal of the switch M3.

An output terminal of the inverter LV3 is connected to an input terminal of the level shifter LS. The level shifter LS changes the level of a signal input to the level shifter LS, and then outputs the signal. An output terminal of the level shifter LS is connected to a gate terminal of the switch M3 and a gate terminal of the switch M2. A source terminal of the switch M3 is connected to the detection terminal VM2. A source terminal of the switch M2 is connected to the charge control terminal CO.

In the example illustrated in FIG. 4, a signal for the first power supply terminal VDD is input from the control circuit 1a to the input terminal of the inverter LV1. A signal for the second power supply terminal VSS is input from the control circuit 1a to the input terminal of the inverter LV2. A signal for the detection terminal VM2 is input from the control circuit 1a to the input terminal of the inverter LV3.

In the first case described above, the voltage of the second power supply terminal VSS is input to the gate terminal of the switch M5, thereby switching on the switch M5. The voltage of the detection terminal VM2 is input to the gate terminal of the switch M3, thereby switching off the switch M3. The voltage of the second power supply terminal VSS is input to the gate terminal of the switch M4, thereby switching off the switch M4. The voltage of the first power supply terminal VDD is input to the gate terminal of the switch M1, thereby switching on the switch M1. The voltage of the first power supply terminal VDD is input to the gate terminal of the switch M2, thereby switching on the switch M2. The output circuit 1b consequently outputs the voltage of the first power supply terminal VDD from the charge control terminal CO.

In the second case described above, the voltage of the first power supply terminal VDD is input to the gate terminal of the switch M5, thereby switching off the switch M5. The voltage of the first power supply terminal VDD is input to the gate terminal of the switch M1, thereby switching on the switch M1. The voltage of the first power supply terminal VDD is input to the gate terminal of the switch M3, thereby switching on the switch M3. The voltage of the second power supply terminal VSS is input to the gate terminal of the switch M4, thereby switching off the switch M4. The voltage of the detection terminal VM2 is input to the gate terminal of the switch M2, thereby switching off the switch M2. The output circuit 1b consequently outputs the voltage of the detection terminal VM2 from the charge control terminal CO.

In the third case described above, the voltage of the first power supply terminal VDD is input to the gate terminal of the switch M5, thereby switching off the switch M5. The voltage of the first power supply terminal VDD is input to the gate terminal of the switch M2, thereby switching on the switch M2. The voltage of the first power supply terminal VDD is input to the gate terminal of the switch M4, thereby switching on the switch M4. The voltage of the second power supply terminal VSS is input to the gate terminal of the switch M1, thereby switching off the switch M1. The voltage of the detection terminal VM2 is input to the gate terminal of the switch M3, thereby switching off the switch M3. The output circuit 1b consequently outputs the voltage of the second power supply terminal VSS from the charge control terminal CO.

Conclusion of the First Embodiment

As described above, the charge/discharge control circuit 1 according to the first embodiment includes the first power supply terminal VDD which is connected to the first electrode 2a of the secondary battery 2, the second power supply terminal VSS which is connected to the second electrode 2b of the secondary battery 2, the charge control terminal CO which is connected to the gate terminal of the discharge control switch 6 and the gate terminal of the charge control switch 7, the detection terminal VM2, the control circuit 1a, and the output circuit 1b which outputs a charge control signal from the charge control terminal CO. The discharge control switch 6 and the charge control switch 7 are placed along the charge route RT2 which is connected to the second electrode 2b. The detection terminal VM2 is connected to the point RT2a along the charge route RT2 which is opposite from the second electrode 2b with the discharge control switch 6 and the charge control switch 7 interposed therebetween.

In the examples illustrated in FIG. 1 and FIG. 4, which are examples of the charge/discharge control circuit 1 according to the first embodiment, the output circuit 1b outputs, as a first voltage, the voltage of the first power supply terminal VDD in the first case in which the charger 20 is connected between the charge terminal CHA− provided on the charge route RT2 and the charge/discharge terminal P+ provided on the charge/discharge route RT3 which is connected to the first electrode 2a, and in which the control circuit 1a permits charging. The discharge control switch 6 and the charge control switch 7 are switched on by the voltage of the first power supply terminal VDD as a result.

In another example of the charge/discharge control circuit 1 according to the first embodiment, the output circuit 1b may instead output a voltage different from the voltage of the first power supply terminal VDD as the first voltage in order to switch on the discharge control switch 6 and the charge control switch 7 in the first case.

For example, when a charge pump is installed in the battery device 10, the output circuit 1b may output as the first voltage a voltage higher than the voltage of the first power supply terminal VDD in the first case. The discharge control switch 6 and the charge control switch 7 are reduced in on resistance as a result, which helps to reduce heat generation of the battery device 10.

The output circuit 1b may output a voltage lower than the voltage of the first power supply terminal VDD as the first voltage in order to switch on the discharge control switch 6 and the charge control switch 7 in the first case.

In the charge/discharge control circuit 1 according to the first embodiment, the output circuit 1b outputs the voltage of the detection terminal VM2 which differs from the first voltage, in the second case in which the charger 20 is connected between the charge terminal CHA− and the charge/discharge terminal P+, and in which the control circuit 1a prohibits charging. The charge control switch 7 is switched off by the voltage of the detection terminal VM2 as a result.

In the charge/discharge control circuit 1 according to the first embodiment, the output circuit 1b is configured so as to be capable of outputting the voltage of the second power supply terminal VSS in the third case in which the charger 20 is not connected between the charge terminal CHA− and the charge/discharge terminal P+. To give a more detailed description, the output circuit 1b outputs the voltage of the second power supply terminal VSS in the third case when a discharge current from the secondary battery 2 flows in the charge route RT2. The discharge control switch 6 is switched off by the voltage of the second power supply terminal VSS as a result.

In the examples illustrated in FIG. 1 to FIG. 3, which are examples of the battery device 10 to which the charge/discharge control circuit 1 according to the first embodiment is applied, the resistor 5 is placed along the discharge route RT1 and not along the charge route RT2. The amount of heat generated when a large current is used for charging is accordingly smaller than when the resistor is placed along the charge route RT2.

Second Embodiment

A charge/discharge control circuit 1 according to a second embodiment of the present invention is described below. The charge/discharge control circuit 1 according to the second embodiment is configured in the same way as the charge/discharge control circuit 1 according to the first embodiment described above, except for points described below. The charge/discharge control circuit 1 according to the second embodiment therefore has the same effects as those of the charge/discharge control circuit 1 according to the first embodiment except for points described below.

In the example illustrated in FIG. 3, which is an example of the battery device 10 to which the charge/discharge control circuit 1 according to the first embodiment is applied, the output circuit 1b outputs the voltage of the second power supply terminal VSS which is equal to the voltage of the second electrode 2b of the secondary battery 2, even without the flow of a discharge current from the secondary battery 2 in the charge route RT2 in the third case in which the charger 20 is not connected between the charge terminal CHA− and the charge/discharge terminal P+.

On the other hand, in an example of the battery device 10 to which the charge/discharge control circuit 1 according to the second embodiment is applied, the output circuit 1b does not output the voltage of the second power supply terminal VSS which is equal to the voltage of the second electrode 2b of the secondary battery 2, when a discharge current from the secondary battery 2 does not flow in the charge route RT2 in the third case in which the charger 20 is not connected between the charge terminal CHA− and the charge/discharge terminal P+. The output circuit 1b instead outputs the voltage of the first power supply terminal VDD which is equal to the voltage of the first electrode 2a of the secondary battery 2.

In the example of the battery device 10 to which the charge/discharge control circuit 1 according to the second embodiment is applied, the output circuit 1b outputs the voltage of the second power supply terminal VSS which is equal to the voltage of the second electrode 2b of the secondary battery 2, when a discharge current from the secondary battery 2 flows in the charge route RT2 in the third case in which the charger 20 is not connected between the charge terminal CHA− and the charge/discharge terminal P+.

In other words, the output circuit 1b in the battery device 10 to which the charge/discharge control circuit 1 according to the second embodiment is applied is configured so as to be capable of outputting the voltage of the second power supply terminal VSS in the third case (the third case includes a case in which a discharge current from the secondary battery 2 flows in the charge route RT2 and a case in which a discharge current from the secondary battery 2 does not flow in the charge route RT2).

The output circuit 1b in the battery device 10 to which the charge/discharge control circuit 1 according to the second embodiment is applied outputs the voltage of the first power supply terminal VDD in the third case when a discharge current from the secondary battery 2 does not flow in the charge route RT2. The discharge control switch 6 is switched on as a result.

The output circuit 1b in the battery device 10 to which the charge/discharge control circuit 1 according to the second embodiment is applied outputs the voltage of the second power supply terminal VSS in the third case when a discharge current from the secondary battery 2 flows in the charge route RT2. The discharge control switch 6 is switched off as a result.

Third Embodiment

A charge/discharge control circuit 1 according to a third embodiment of the present invention is described below. The charge/discharge control circuit 1 according to the third embodiment is configured in the same way as the charge/ discharge control circuit 1 according to the first embodiment described above, except for points described below. The charge/discharge control circuit 1 according to the third embodiment therefore has the same effects as those of the charge/discharge control circuit 1 according to the first embodiment except for points described below.

Figure 5:
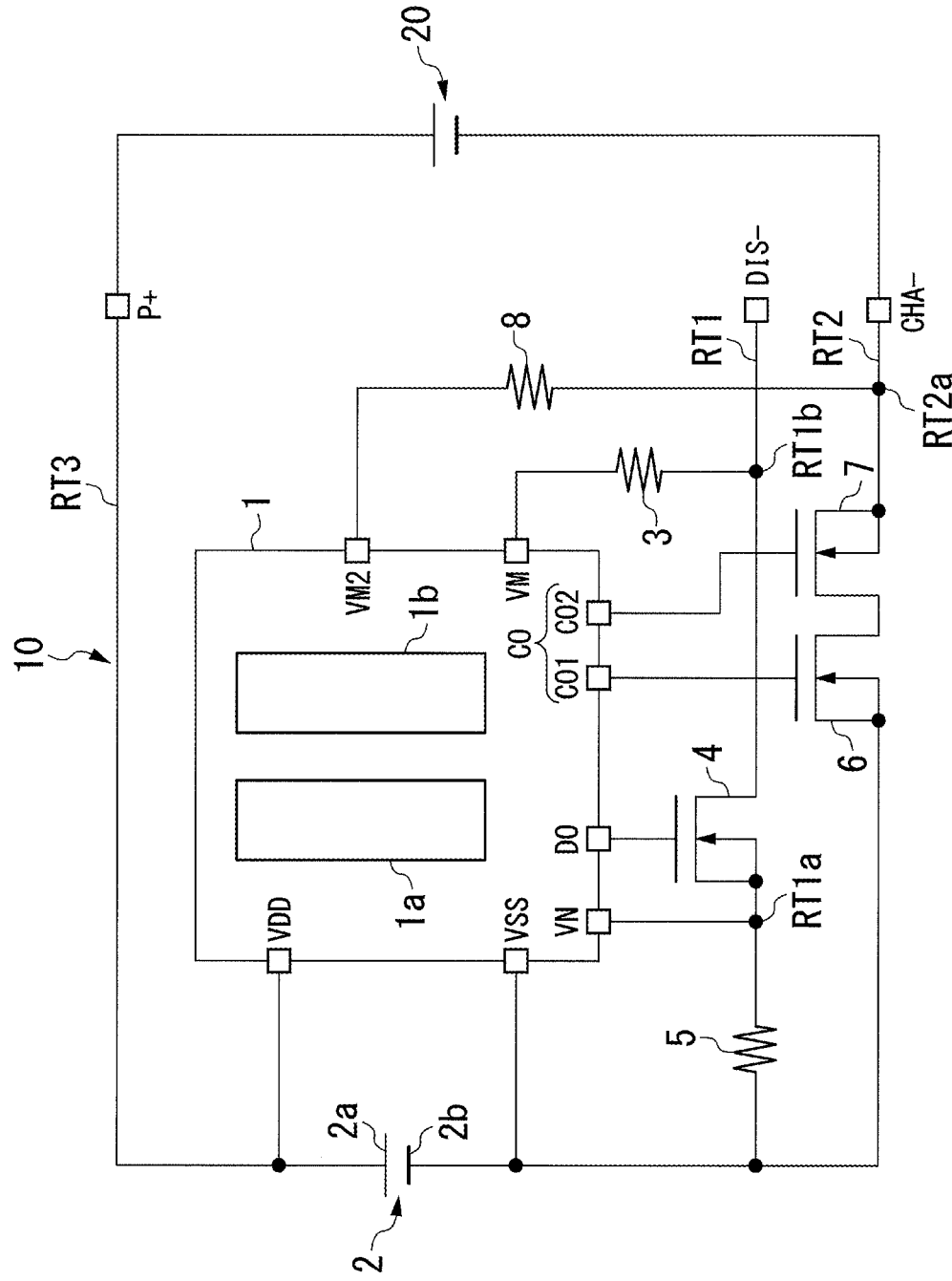
FIG. 5 is a diagram for illustrating an example of a battery device to which a charge/discharge control circuit according to a third embodiment of the present invention is applied.
Figure 6:
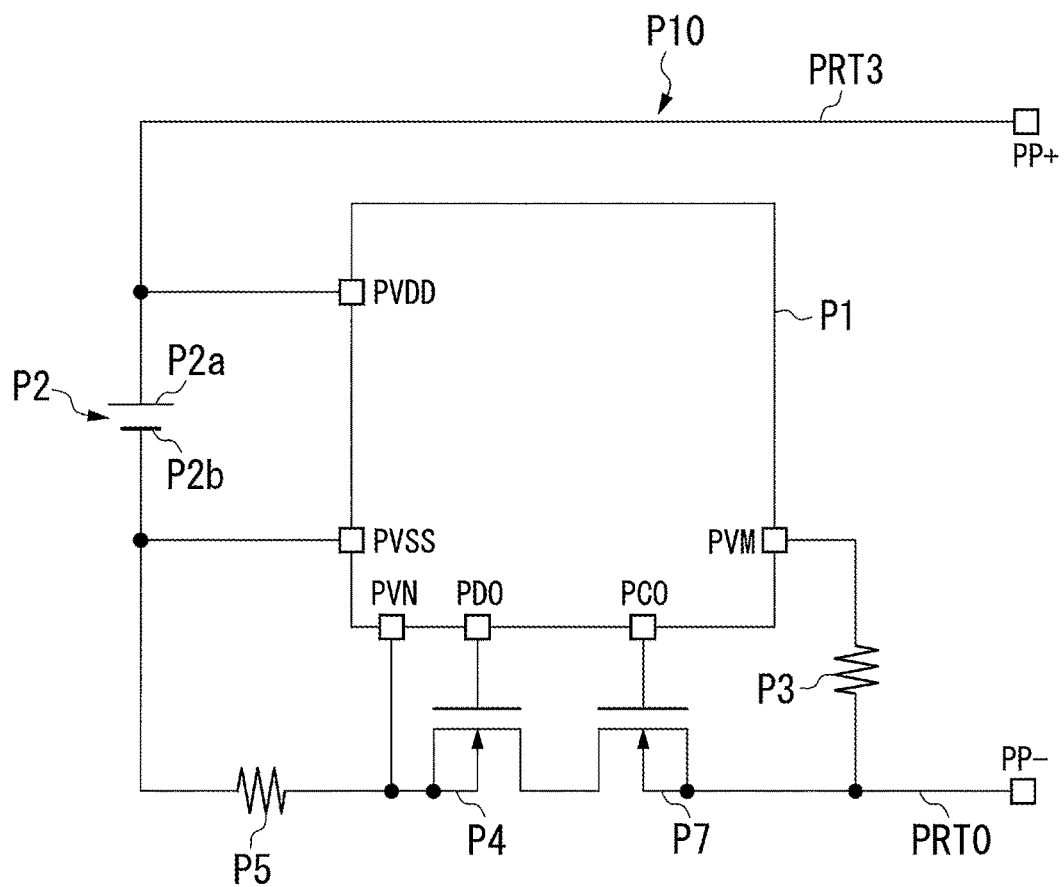
FIG. 6 is a diagram for illustrating an example of a battery device of the related art which is configured in the same way as a battery device described in Japanese Patent Application Laid-open No. 2015-220856.
Figure 7:
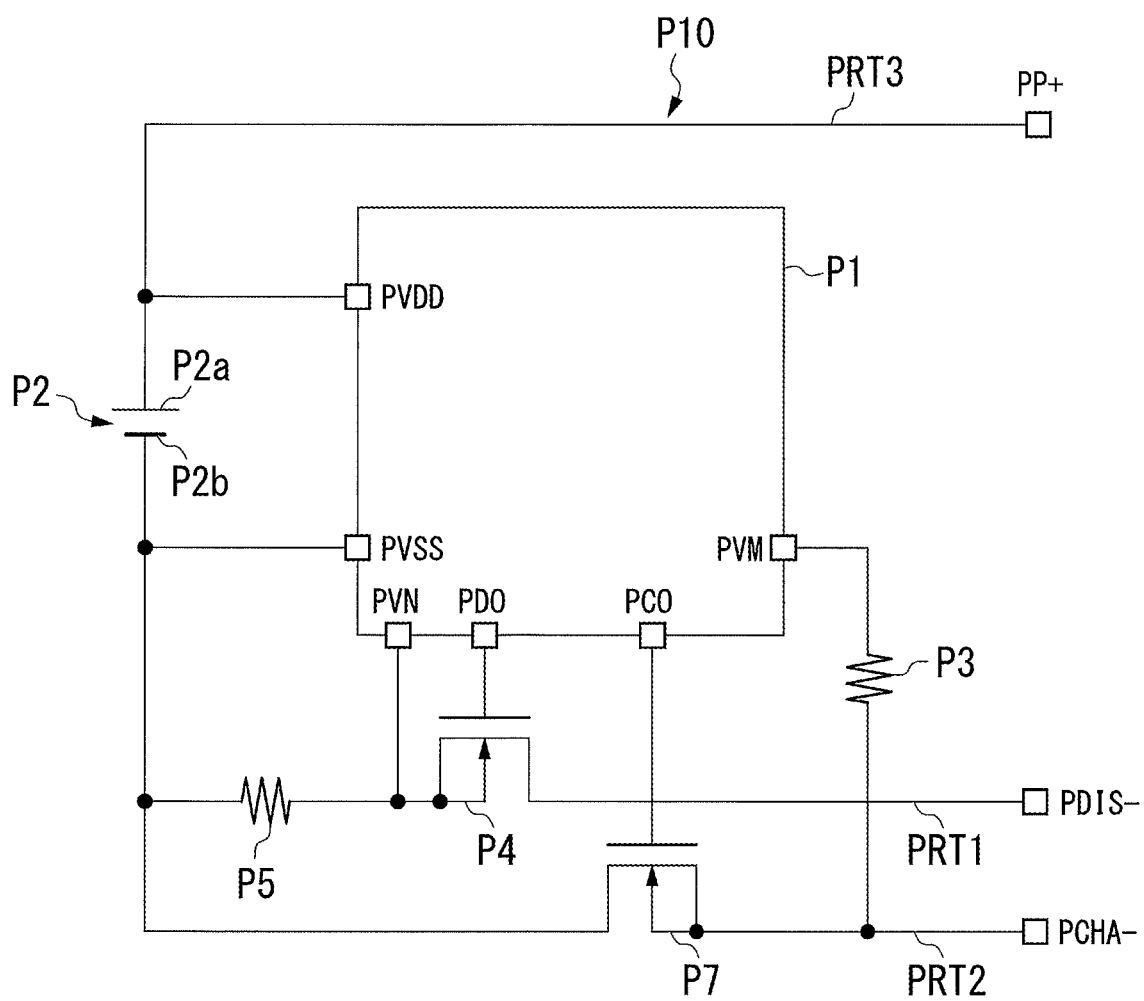
FIG. 7 is a diagram for illustrating another example of the battery device of the related art.
Figure 8:
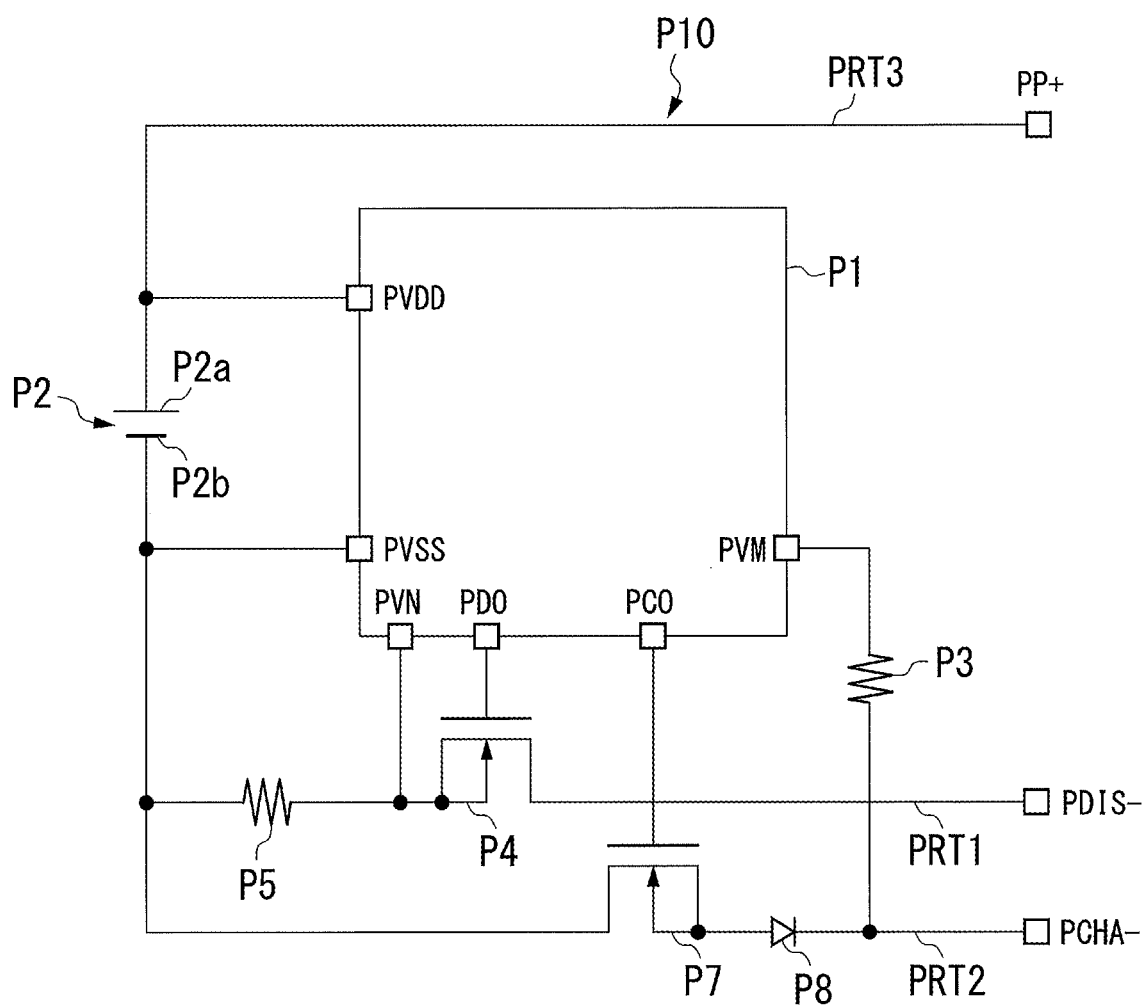
FIG. 8 is a diagram for illustrating an example of a battery device of the related art in which a diode for cutting off a discharge current is placed along a charge route as in a battery device described in Japanese Patent Application Laid-open No. 2011-176940.

FIG. 5 is a diagram for illustrating an example of the battery device 10 to which the charge/discharge control circuit 1 according to the third embodiment is applied.

In the examples illustrated in FIG. 1 to FIG. 3, which are examples of the battery device 10 to which the charge/discharge control circuit 1 according to the first embodiment is applied, the charge control terminal CO is formed of one terminal as described above. The charge control terminal CO in FIG. 1 to FIG. 3 is also connected to the gate terminal of the discharge control switch 6 and the gate terminal of the charge control switch 7.

Meanwhile, in the example illustrated in FIG. 5, which is the example of the battery device 10 to which the charge/discharge control circuit 1 according to the third embodiment is applied, the charge control terminal CO is formed of two terminals CO1 and CO2. The terminal CO1 of the charge control terminal CO is connected to the gate terminal of the discharge control switch 6, and the terminal CO2 of the charge control terminal CO is connected to the gate terminal of the charge control switch 7.

In the example illustrated in FIG. 5, which is the example of the battery device 10 to which the charge/discharge control circuit 1 according to the third embodiment is applied, the output circuit 1b outputs a charge control signal from the terminals CO1 and CO2 of the charge control terminal CO in a first case, a second case, and a third case.

<First Case>

The output circuit 1b in the example of FIG. 5 outputs the voltage of the first power supply terminal VDD which is equal to the voltage of the first electrode 2a of the secondary battery 2, from the terminal CO1 of the charge control terminal CO in the first case. The discharge control switch 6 is switched on as a result.

The output circuit 1b in the example of FIG. 5 outputs the voltage of the first power supply terminal VDD which is equal to the voltage of the first electrode 2a of the secondary battery 2 from the terminal CO2 of the charge control terminal CO in the first case. The charge control switch 7 is switched on as a result.

<Second Case>

The output circuit 1b in the example of FIG. 5 outputs the voltage of the detection terminal VM2 from the terminal CO2 of the charge control terminal CO in the second case. The charge control switch 7 is switched off as a result.

The output circuit 1b in the example of FIG. 5 may output the voltage of the detection terminal VM2 or a voltage different from the voltage of the detection terminal VM2 from the terminal CO1 of the charge control terminal CO in the second case.

<Third Case>

The output circuit 1b in the example of FIG. 5 outputs the voltage of the second power supply terminal VSS which is equal to the voltage of the second electrode 2b of the secondary battery 2 from the terminal CO1 of the charge control terminal CO in the third case. The discharge control switch 6 is switched off as a result.

The output circuit 1b in the example of FIG. 5 may output the voltage of the second power supply terminal VSS or a voltage different from the voltage of the second power supply terminal VSS from the terminal CO2 of the charge control terminal CO in the third case.

The embodiments of the present invention and the variations thereof have been described above. However, those embodiments and variations are presented as examples and are not intended to limit the scope of the invention. Those embodiments and variations may be implemented in other various modes, and various kinds of omissions, replacements, and modifications can be made without departing from the gist of the invention. Those embodiments and variations are included in the scope and gist of the invention, and are also included in the invention described in the appended claims and the scope of their equivalents. The embodiments and variations described above can be combined with one another to suit individual cases.

What is claimed is:

1. A charge/discharge control circuit, comprising:
a first power supply terminal configured to connect to a first electrode of a secondary battery;
a second power supply terminal configured to connect to a second electrode of the secondary battery;
a charge control terminal configured to connect to a gate terminal of a discharge control switch and a gate terminal of a charge control switch;
a detection terminal;
a control circuit; and
an output circuit configured to output a charge control signal from the charge control terminal,
the discharge control switch and the charge control switch being placed along a charge route connected to the second electrode,
the detection terminal being connected to a point along the charge route opposite from the second electrode with the discharge control switch and the charge control switch interposed therebetween,
the output circuit being configured to output a first voltage, provided that a charger is connected between a charge terminal which is disposed on the charge route and a charge/discharge terminal which is disposed on a charge/discharge route connected to the first electrode, and that the control circuit permits charging,
the output circuit being configured to output a voltage of the detection terminal which differs from the first voltage, provided that the charger is connected between the charge terminal and the charge/discharge terminal, and that the control circuit prohibits charging, and
the output circuit being configured to be able to output a voltage of the second power supply terminal which differs from the first voltage, provided that the charger is not connected between the charge terminal and the charge/discharge terminal.

2. A charge/discharge control circuit according to claim 1, wherein the output circuit is configured to output the voltage of the second power supply terminal, provided that the charger is not connected between the charge terminal and the charge/discharge terminal, and that a discharge current from the secondary battery flows in the charge route.

3. A charge/discharge control circuit according to claim 2, wherein the discharge control switch and the charge control switch are switched on by the first voltage, provided that the charger is connected between the charge terminal and the charge/discharge terminal, and that the control circuit permits charging,
wherein the charge control switch is switched off by the voltage of the detection terminal, provided that the charger is connected between the charge terminal and the charge/discharge terminal, and that the control circuit prohibits charging, and wherein the discharge control switch is switched off by the voltage of the second power supply terminal, provided that the charger is not connected between the charge terminal and the charge/discharge terminal, and that a discharge current from the secondary battery flows in the charge route.

4. A battery device, comprising:
the charge/discharge control circuit of claim 3;
the secondary battery;
the charge/discharge route connected to the first electrode of the secondary battery;
the charge/discharge terminal provided on the charge/discharge route;
the charge route connected to the second electrode of the secondary battery;
the charge terminal provided on the charge route;
the discharge control switch placed along the charge route;
the charge control switch placed along the charge route;
a discharge route connected to the second electrode of the secondary battery;
a discharge terminal provided on the discharge route; and
another discharge control switch placed along the discharge route.

5. A battery device, comprising:
the charge/discharge control circuit of claim 2;
the secondary battery;
the charge/discharge route connected to the first electrode of the secondary battery;
the charge/discharge terminal provided on the charge/discharge route;
the charge route connected to the second electrode of the secondary battery;
the charge terminal provided on the charge route;
the discharge control switch placed along the charge route;
the charge control switch placed along the charge route;
a discharge route connected to the second electrode of the secondary battery;
a discharge terminal provided on the discharge route; and
another discharge control switch placed along the discharge route.

6. A battery device, comprising:
the charge/discharge control circuit of claim 1;
the secondary battery;
the charge/discharge route connected to the first electrode of the secondary battery;
the charge/discharge terminal provided on the charge/discharge route;
the charge route connected to the second electrode of the secondary battery;
the charge terminal provided on the charge route;
the discharge control switch placed along the charge route;
the charge control switch placed along the charge route;
a discharge route connected to the second electrode of the secondary battery;
a discharge terminal provided on the discharge route; and
another discharge control switch placed along the discharge route.

* * * * *